United States Patent
Riedlinger et al.

(10) Patent No.: US 11,307,950 B2
(45) Date of Patent: Apr. 19, 2022

(54) COMPUTING DEVICE HEALTH MONITORING SYSTEM AND METHODS

(71) Applicant: NeuShield, Inc., Fremont, CA (US)

(72) Inventors: Elisha Riedlinger, Newark, CA (US); Fei Qi, Dublin, CA (US); Yuen Pin Yeap, Saratoga, CA (US)

(73) Assignee: NeuShield, Inc., Fremont, CA (US)

( * ) Notice: Subject to any disclaimer, the term of this patent is extended or adjusted under 35 U.S.C. 154(b) by 0 days.

(21) Appl. No.: 17/214,882

(22) Filed: Mar. 28, 2021

(65) Prior Publication Data

US 2021/0216424 A1 Jul. 15, 2021

Related U.S. Application Data

(63) Continuation-in-part of application No. 16/271,055, filed on Feb. 8, 2019, now Pat. No. 10,983,893.

(51) Int. Cl.
| | |
|---|---|
| *G06F 11/00* | (2006.01) |
| *G06F 11/30* | (2006.01) |
| *G06F 11/07* | (2006.01) |
| *G06F 11/32* | (2006.01) |

(52) U.S. Cl.
CPC ...... *G06F 11/3034* (2013.01); *G06F 11/0772* (2013.01); *G06F 11/3058* (2013.01); *G06F 11/328* (2013.01)

(58) Field of Classification Search
CPC ............. G06F 11/3034; G06F 11/0772; G06F 11/3058; G06F 11/328; G06F 11/3452; G06F 11/3055; G06F 2201/81; G06F 2201/88; G06F 21/554

USPC ........................................................ 714/1–57
See application file for complete search history.

(56) References Cited

U.S. PATENT DOCUMENTS

| | | | |
|---|---|---|---|
| 2004/0260967 A1* | 12/2004 | Guha ................. | G06F 11/1084 714/3 |
| 2005/0210337 A1* | 9/2005 | Chester ............. | G05B 23/0254 714/47.2 |
| 2008/0052326 A1* | 2/2008 | Evanchik ........... | G06F 11/1464 |
| 2010/0011100 A1* | 1/2010 | Kaneko .............. | G06F 11/008 709/224 |
| 2010/0275060 A1* | 10/2010 | Liu .................... | G06F 11/1451 714/15 |
| 2013/0047038 A1* | 2/2013 | Huang ............... | G06F 11/0751 714/38.1 |

(Continued)

*Primary Examiner* — Sarai E Butler
(74) *Attorney, Agent, or Firm* — Patentfile, LLC; Bradley C. Fach; Steven R. Kick

(57) ABSTRACT

A data health monitoring system and method are provided which may be configured to monitor different indicators or parameters of a computing device which may affect the health of the computing device, such as which may be used in looking for early warning signs that could indicate future data loss or corruption. The system may periodically query certain data health indicators, such as S.M.A.R.T. status, disk temperature, read and write errors, etc. The system may also monitor data as it is being accessed keeping track of other indicators such as: files that are modified, when the last backed up was, protection status of the file, type of changes made to the file, which application is making changes, etc. Preferably, the combined status of each data health indicator may be rolled up into a simple message and shown to the user via notifications, reports, logs or a user interface.

17 Claims, 9 Drawing Sheets

(56) References Cited

U.S. PATENT DOCUMENTS

| | | | |
|---|---|---|---|
| 2013/0066832 A1* | 3/2013 | Sheehan | G06Q 10/00 707/634 |
| 2014/0136903 A1* | 5/2014 | Hyde | G11C 29/886 714/47.3 |
| 2014/0189442 A1* | 7/2014 | DeGraaf | G06F 11/0709 714/48 |
| 2014/0359365 A1* | 12/2014 | Kottler | G06F 11/079 714/37 |
| 2015/0161024 A1* | 6/2015 | Gupta | G06F 21/44 714/47.3 |
| 2015/0370627 A1* | 12/2015 | Nakajima | G06F 11/3409 714/2 |
| 2016/0055044 A1* | 2/2016 | Kawai | G06F 11/3082 714/26 |
| 2016/0077930 A1* | 3/2016 | Mckelvie | G06F 3/0688 714/19 |
| 2016/0232052 A1* | 8/2016 | Ambroladze | G06F 11/1004 |
| 2019/0014018 A1* | 1/2019 | Ramalingam | G06F 11/0766 |
| 2019/0171381 A1* | 6/2019 | Ioannou | G06F 3/0604 |

\* cited by examiner

COMPUTING DEVICE HEALTH MONITORING SYSTEM AND METHODS

CROSS REFERENCE TO RELATED APPLICATIONS

This application is a continuation-in-part of U.S. Non-Provisional application Ser. No. 16/271,055, filed on Feb. 8, 2019, entitled "DATA HEALTH MONITORING SYSTEM AND METHODS", which is hereby incorporated by reference in its entirety.

FIELD OF THE INVENTION

This patent specification relates to the field of computer health monitoring. More specifically, this patent specification relates to systems and methods for providing early warning signs of computing device issues, such as those that could lead to data corruption or loss.

BACKGROUND

In today's computing environment there are many factors that could lead to computer data loss or corruption. For example, some factors include: overheated disk drives, controller failures, old backups, encrypted or ransomed data, low disk space, read or write errors, etc. It can be difficult for users to monitor all these different aspects of a computer. Having these indicators continually monitored can be valuable for users to ensure the health of their data and to prevent future corruption or loss of data.

Therefore, a need exists for novel computer-implemented systems and methods for computer data health monitoring. A further need exists for novel computer-implemented systems and methods that are configured to monitor different aspects of a computer which may indicate computer data loss or corruption. There is also a need for novel computer-implemented systems and methods that are configured to provide early warning signs of issues that could lead to data corruption or loss.

BRIEF SUMMARY OF THE INVENTION

A computing device health monitoring system and method are provided which may be configured to monitor different indicators of a computing device which may affect the health of the computing device, looking for early warning signs that could indicate future data loss or corruption. Preferably, the combined status of each data health indicator may be rolled up into a simple message and shown to the user via notifications, reports, logs or a user interface. This system and methods provide advantages over other systems and methods in at least two ways. First of all, it is holistic monitoring of hardware, software and application behaviors. Secondly, it makes the user aware of the status in a simple and straightforward way.

In some embodiments, the computing device health monitoring system may include: a data store having one or more, such as a plurality, of files; a computing device in communication with the data store, the computing device having a processor, a memory in communication with the processor; and data logic stored in the memory, executable by the processor and configured to access a file from the datastore, to determine if the file is a user data file, and to determine if the file is being protected by the system.

In further embodiments, the computing device health monitoring system may include: a computing device having a processor, a memory in communication with the processor, a cooling device, a disk drive, a display screen, a data store, and a critical component; and physical logic stored in the memory, executable by the processor and configured to determine if the cooling device is running properly, to determine if the critical component temperature is within a desired range, and to determine if a disk drive error is detected.

In further embodiments, the computing device health monitoring system may include a computing device having a processor, a memory in communication with the processor, and a data store having a plurality of files. An indexing logic executable by the processor and configured to read and measure one or more parameters of the computing device, and the parameter(s) may be used as an input by the indexing logic to calculate a health index value. Preferably, the indexing logic may calculate the health index value using at least one parameter selected from: the percentage of the plurality of files that have been manipulated by a target program; the number of read and write errors on the data store; and the disk temperature of the data store.

In further embodiments, the computing device health monitoring system may include: a computing device having a processor, a memory in communication with the processor, a display screen, a data store having a plurality of files, and a target program running on the computing device; indexing logic stored in the memory, executable by the processor and configured to read a process parameter of the computing device, to read a behavior parameter of the computing device, to calculate a health index value for computing device that is running a target program, and to determine if the health index value is greater than a threshold value; and communication logic stored in the memory, executable by the processor and configured to output warning, such as via the display screen, if the health index value is greater than an index threshold value.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
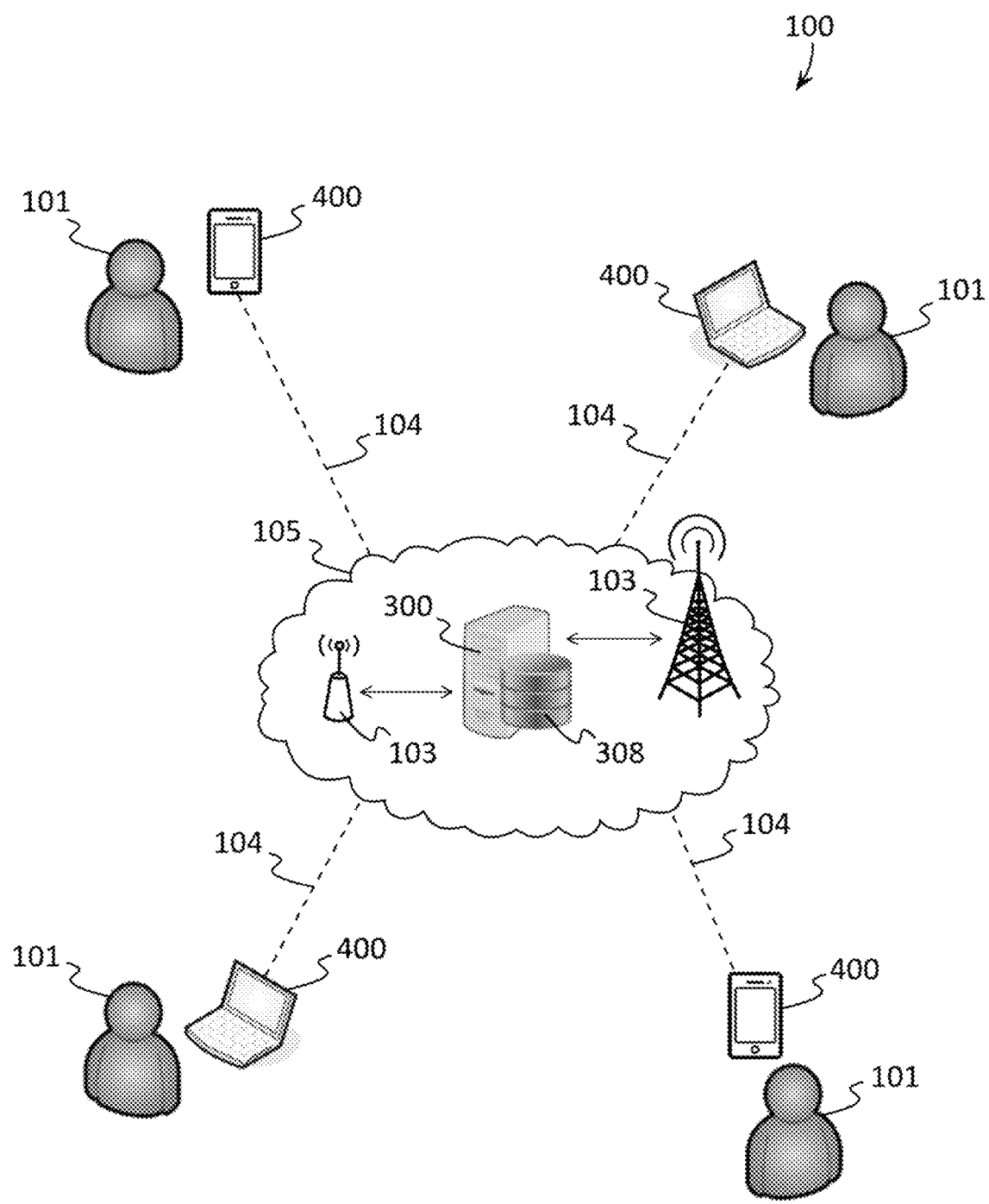
FIG. 1—FIG. 1 depicts an illustrative example of some of the components and computer implemented methods which may be found in a computing device health monitoring system according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the terms "computer" and "computing device" refers to a machine, apparatus, or device that is capable of accepting and performing logic operations from software code. The term "application", "software", "software code", "source code", "script", or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, servers, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of client devices include: personal computers (PCs), workstations, servers, laptops, tablet PCs including the iPad, cell phones including iOS phones made by Apple Inc., Android OS phones, Microsoft OS phones, Blackberry phones, Apple iPads, Anota digital pens, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, tablets, digital pens, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN), a cellular network, a Zigby network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store), file system, or any other data storage method.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for computing device health monitoring are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a computing device health monitoring system ("the system") 100 according to some embodiments is presented. The system 100 is configured to monitor computing devices, such as client devices 400 and servers 300, for indicators or parameters that may affect the computing device, such as those that may affect health of their data by looking for early warning signs that could indicate future data loss or corruption and presenting this information to a user 101. The system 100 may transfer data between one or more access points 103, client devices 400, and servers 300 over a data network 105. Each client device 400 and server 300 may send data to and receive data from the data network 105 through a network connection 104 with an access point 103. Data monitored by the system 100 may include data stored in a data store 308, 408, of one or more servers 300 and client devices 400, respectively.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In preferred embodiments, the system 100 may include a computing device 300, 400, having a processor 302, 402, a memory 310, 410, in communication with the processor 302, 402, and a data store 308, 408, having a plurality of files. An indexing engine 131 may be executable by the processor 302, 402, and may be configured to read and measure one or more parameters of the computing device 300, 400, and the parameter(s) may be used as an input by the indexing engine 131 to calculate a health index value. Preferably, the indexing engine 131 may calculate the health index value using at least one parameter selected from: the percentage of the plurality of files that have been manipulated by a target program; the number of read and write errors on the data store; and the disk temperature of the data store.

In some embodiments, the system 100 may be configured to periodically query certain data health indicators of one or more computing devices 300, 400, of the system 100. These health indicators may include S.M.A.R.T. status, disk temperature, read and write errors, etc. These data health indicators may be called periodic indicators. In further embodiments, the system 100 may be configured to monitor data of a computing device 300, 400, as it is being accessed by a target program 900 while monitoring other indicators such as: files that are modified, when the last backed up was, protection status of the file, type of changes made to the file, which application is making changes, etc. A target program 900 may comprise any program or software that may be running on a computing device 300, 400, and these data health indicators may be called real-time indicators. In still further embodiments, the system 100 may be configured to present information describing one or more computing devices 300, 400, to a user 101. This information may include information which describes an overall status of the one or more computing devices 300, 400, and preferably may include both periodic and real-time indicators of the one or more computing devices 300, 400.

Figure 2:
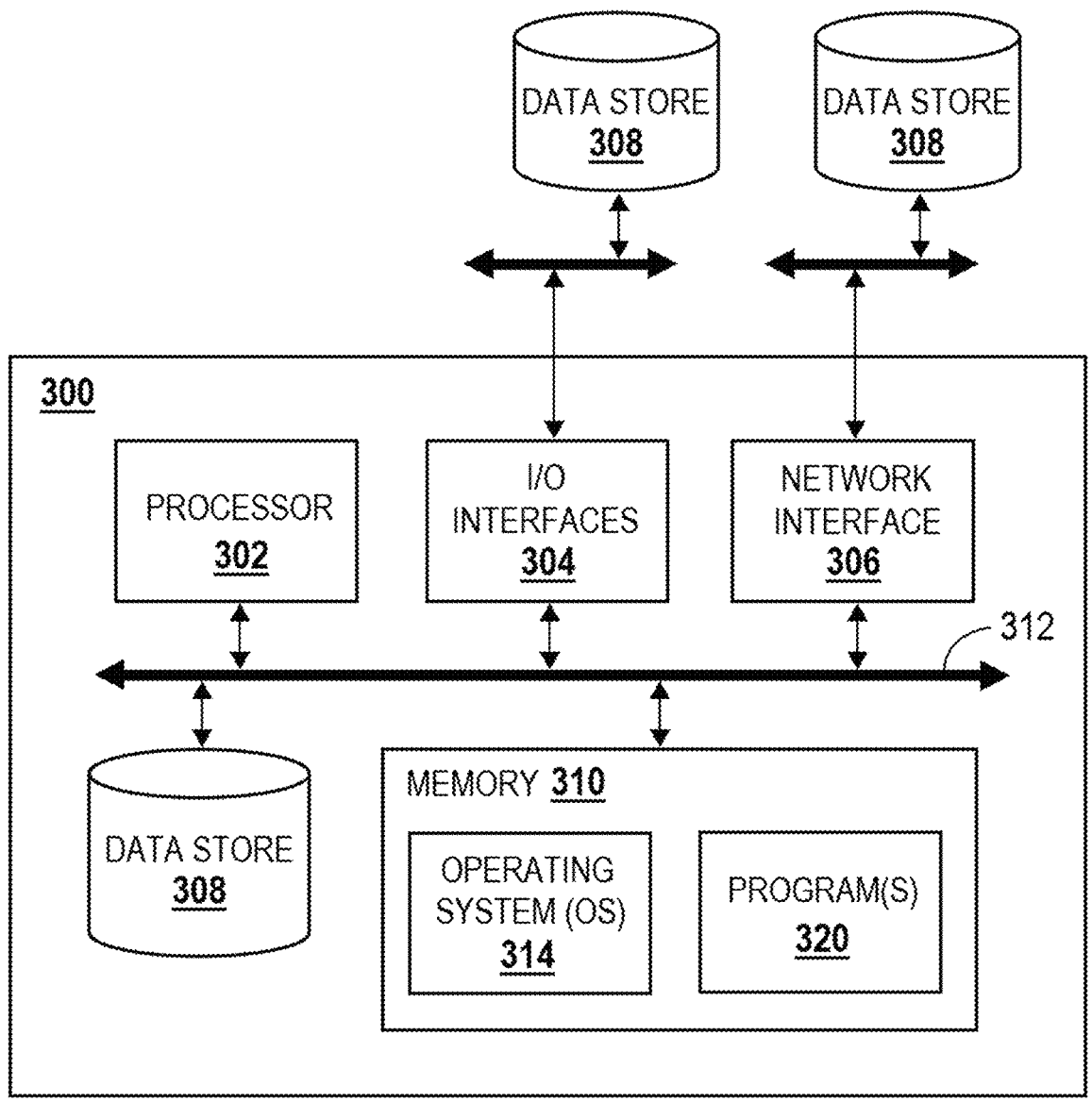
FIG. 2—FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing device. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008/2012/2016 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
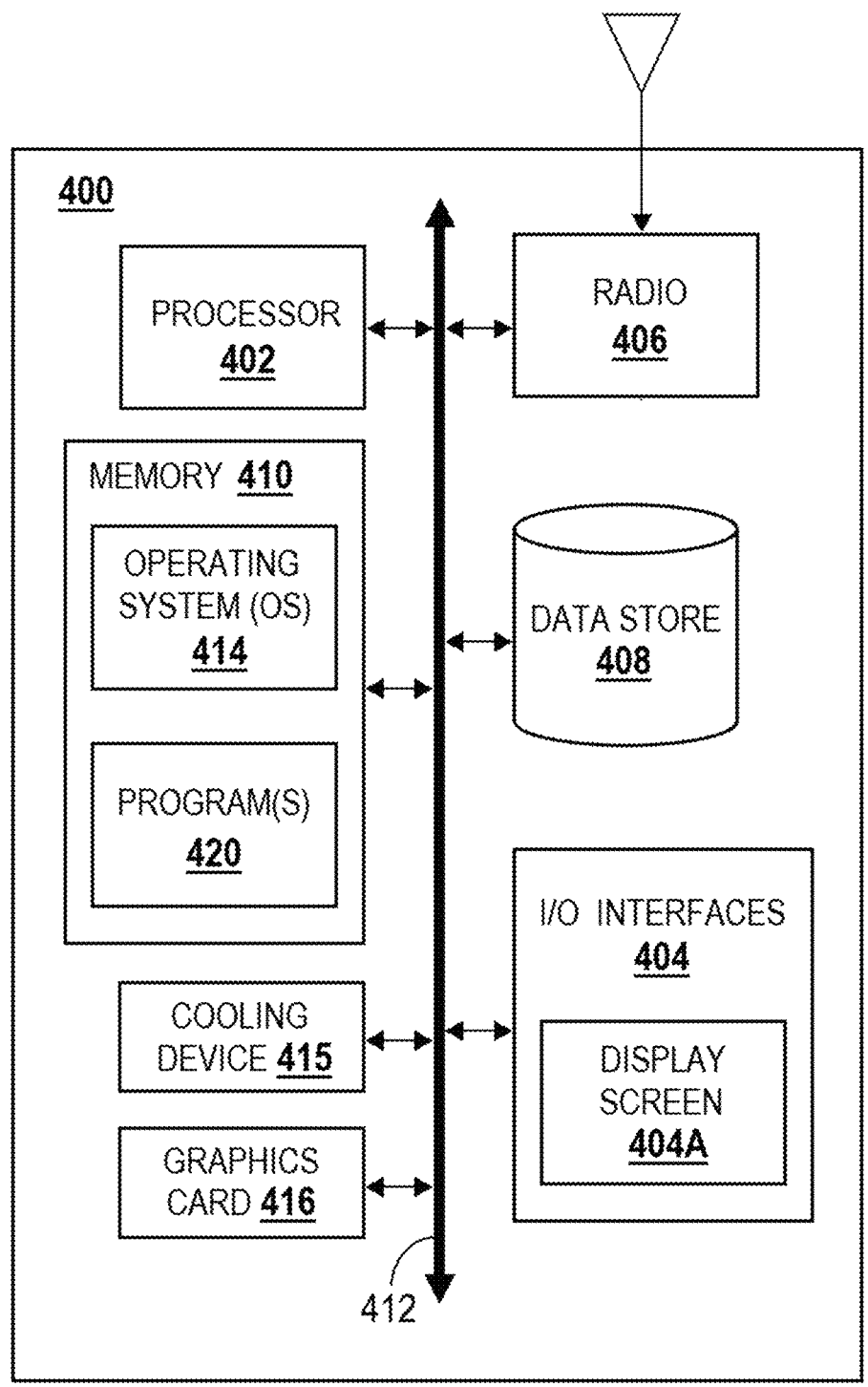
FIG. 3—FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing device. The client device 400 can be a digital device that, in terms of hardware architecture, generally includes a processor 402, input/output (I/O) interfaces 404, a radio 406, a data store 408, memory 410, an optional cooling device 415, and an optional graphics card 416. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, a motherboard, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Optionally, a computing device, such as a client device 400 and server 300, may comprise one or more cooling devices 415 and/or graphics cards 416. A cooling device 415 may comprise a fan, heat sink, water pump, or any other cooling or temperature regulating device or method. A graphics card 416 (also called a video card, display card, graphics card, display adapter or graphics adapter) is an expansion card which generates a feed of output images to a display (such as a computer monitor).

Figure 4A:
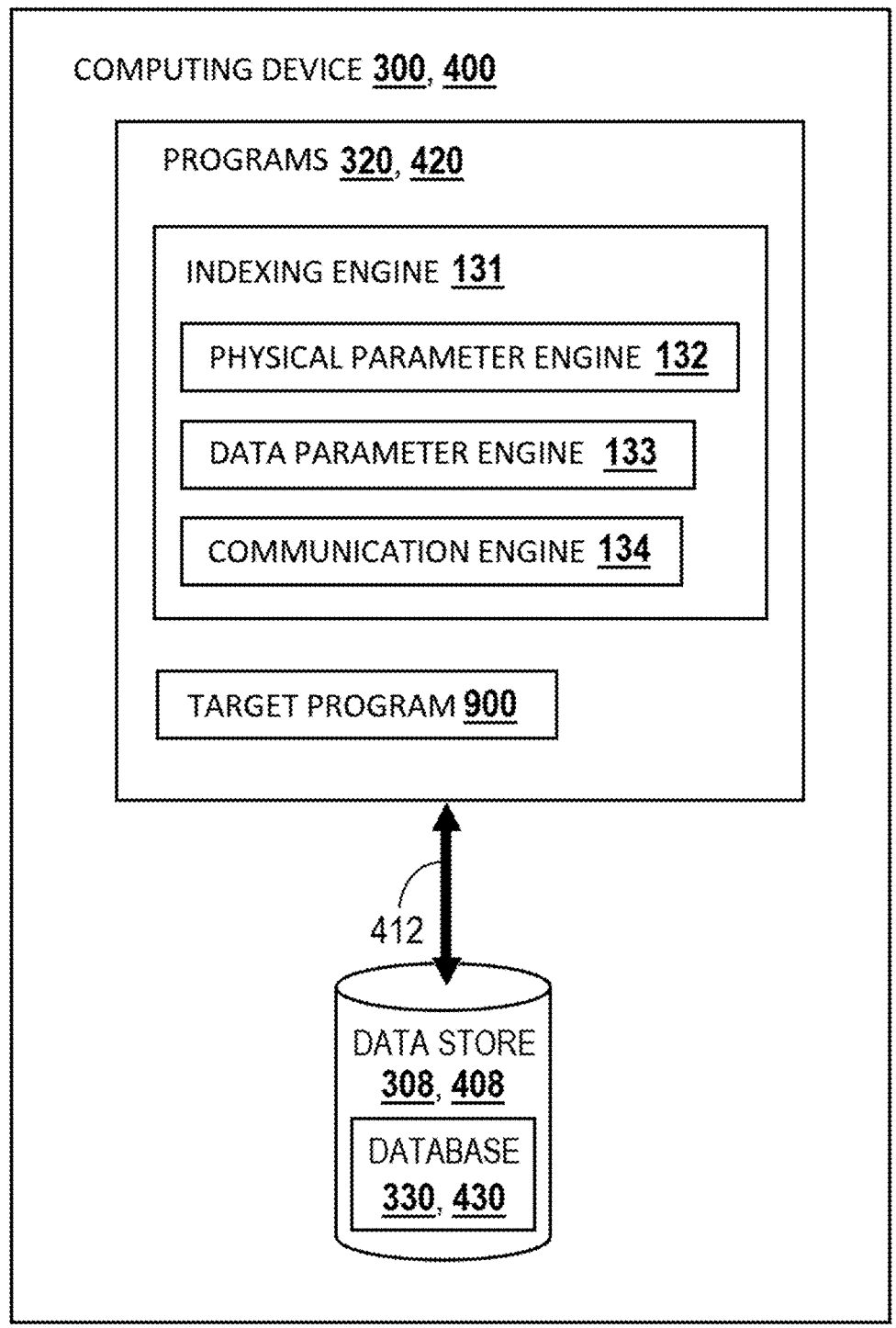
FIG. 4A—FIG. 4A depicts a block diagram illustrating some applications of a computing device health monitoring system which may function as software rules engines according to various embodiments described herein.
Figure 4B:
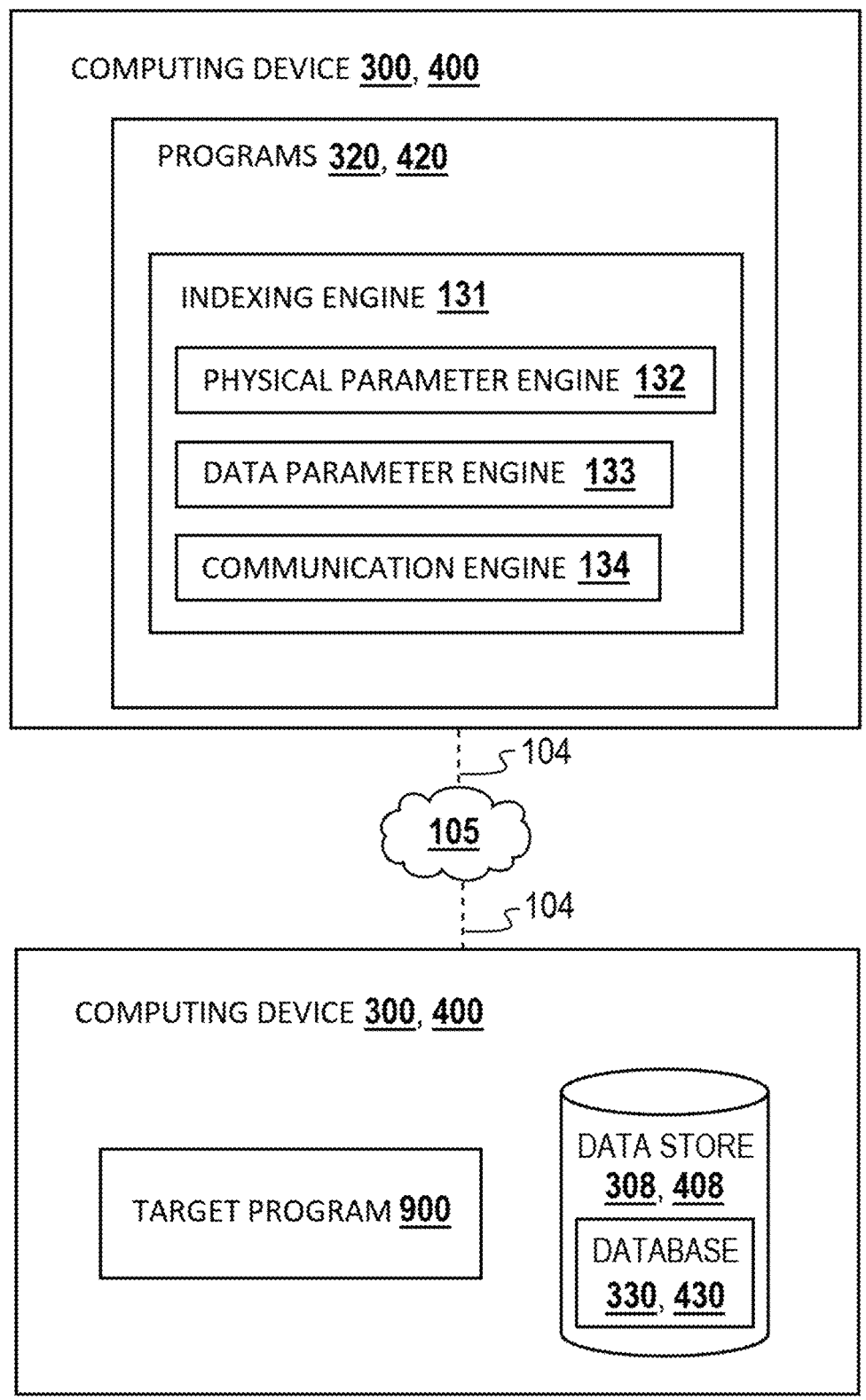
FIG. 4B—FIG. 4B shows another block diagram illustrating some applications of a computing device health monitoring system which may function as software rules engines according to various embodiments described herein.

Referring now to FIGS. 4A and 4B block diagrams showing some software rules engines which may be found in a system 100 (FIG. 1) according to various embodiments described herein are illustrated. In some embodiments, the system 100 may comprise a physical parameter engine 132, a data parameter engine 133, and a communication engine 134 which may optionally be included in an indexing engine 131. It should be understood that the functions attributed to the engines 131, 132, 133, 134, described herein are exemplary in nature, and that in alternative embodiments, any function attributed to any engine 131, 132, 133, 134, may be performed by one or more other engines 131, 132, 133, 134, or any other suitable processor logic.

Optionally, one or more of the engines may be configured to run on one or more computing devices, such as a server 300 and/or a client device 400, which may be in wired and/or wireless electronic communication through a network 105 with one or more data stores 308, 408, and one or more of their respective databases 330, 430. The engines 131, 132, 133, 134, may read, write, or otherwise access data in one or more databases 330, 430, of a data store 308, 408. Additionally, the engines 131, 132, 133, 134, may be in electronic communication so that data may be readily exchanged between the engines 131, 132, 133, 134.

The system 100 may be configured to monitor the data in one or more data stores 308, 408, such as in one or more databases 330 and/or file systems stored in a data store 308 of a server 300 and a database 430 and/or file systems stored in a data store 408 of a client device 400. The system 100 may comprise or be in communication with the one or more databases 330, 430. The databases 330, 430, may contain any data content and type which may be stored by in a data store 308, 408. Additionally, the system 100 may be configured to monitor one or more target programs 900. A target program 900 may comprise any program or software that may be running on a computing device 300, 400, and which may be reading, writing, or otherwise accessing data of the computing device 300, 400. FIG. 4A shows an example in which the target program 900 and engines 131, 132, 133, 134, may be running on the same computing device 300, 400. FIG. 4B depicts an example in which the target program 900 and engines 131, 132, 133, 134, may be running on different computing devices 300, 400, that may be in communication with each other.

In some embodiments, the system 100 may comprise an indexing engine 131 which may comprise or function as indexing logic stored in a memory 310, 410, which may be executable by the processor 302, 402, of a server 300 and/or client device 400. The indexing engine 131 may be configured to calculate a health index value for a computing device 300, 400, that is running a target program 900, such as a program that is writing data to a data store 308, 408, or a program that is otherwise writing or accessing data on the computing device 300, 400. In preferred embodiments, an indexing engine 131 may calculate a health index value for a computing device 300, 400, that is running a target program 900 based on process parameters and behavior parameters of the target program 900.

In some embodiments, an indexing engine 131 may be configured to read or monitor process parameters of the computing device 300, 400, that is running the target program 900. Process parameters may include: if the target program 900 is signed by a legitimate signature authority; if the target program 900 is located in the proper binaries location; if the target program 900 was installed by an unauthorized user (an unauthorized user being someone or an entity, such as a malicious program, that gains access a client device 400 of the system 100 using someone else's account/login information or other methods); if the target program 900 was downloaded from the internet; if the target program 900 was obtained from an email; if the target program 900 is unknown; and any other process parameter of the target program 900. In further embodiments, an indexing engine 131 may be configured to read or monitor behavior parameters of the computing device 300, 400, that is running the target program 900. Behavior parameters may include: if the target program 900 is reading and/or writing to all or almost all files on the computing device 300, 400; if the target program 900 has written a file that has a high entropy value; if the target program 900 has changes the magic number of a file; the percentage of files created, modified, renamed or deleted by the target program 900; and any other behavior parameter of the target program 900.

In some embodiments, an indexing engine 131 may be configured to monitor one or more indicators or parameters which may affect the health of a computing device 300, 400, and to provide information describing the health of the computing device 300, 400, to a user 101.

In further embodiments, an indexing engine 131 may be configured to read and/or determine one or more parameters or indicators of a computing device 300, 400, and to calculate a health index value for the computing device 300, 400, using the one or more parameters or indicators. In some embodiments, parameters or indicators of a computing device 300, 400, which may be used to calculate a health index value may include: a number of read and write errors of a data store 308, 408, memory 310, 410, etc., of the computing device 300, 400; a disk temperature of a data store 308, 408, memory 310, 410, etc., of the computing device 300, 400; a time of a last back up of a plurality of files of a data store 308, 408, memory 310, 410, etc., of the computing device 300, 400; a number of blue screen of deaths (BSODs) or system crashes of the computing device 300, 400; and an amount and/or percentage of free disk space of a data store 308, 408, memory 310, 410, etc., of the computing device 300, 400.

In some embodiments, the system 100 may comprise a physical parameter engine 132 which may comprise or function as physical logic stored in a memory 310, 410, which may be executable by the processor 302, 402, of a server 300 and/or client device 400. The physical parameter engine 132 may be configured to periodically query certain data health indicators of a computing device 300, 400. These data health indicators may include physical parameters of the computing device 300, 400, such as S.M.A.R.T. status, disk temperature, read and write errors, etc. These data health indicators may be called or referred to as periodic indicators.

In some embodiments, the system 100 may comprise a data parameter engine 133 which may comprise or function as data logic stored in a memory 310, 410, which may be executable by the processor 302, 402, of a server 300 and/or client device 400. The data parameter engine 133 may be configured to monitor data of a computing device 300, 400, as it is being accessed and keeping track of other indicators or parameters such as: files that are modified; when the last back up was; protection status of the file; type of changes made to a file; which application is making changes; etc. These data health indicators may be called or referred to as real-time indicators.

In some embodiments, the system 100 may comprise a communication engine 134 which may comprise or function as communication logic stored in a memory 310, 410, which may be executable by the processor 302, 402, of a server 300 and/or client device 400. The communication engine 134 may be configured to present or display data generated by the system 100, such as data health status, in a simple, clear and concise way to the user 101 via a display screen 404A or other suitable device. In some embodiments, a communication engine 134 may be configured to present data on a display screen 404A which presents an overall status including information from both periodic and real-time indicators to a user 101. For example, status of data health may include graphical icons or indicia such as: Okay, Warning, Error, and Critical. In further embodiments, a communication engine 134 may be configured to present data on a display screen 404A which presents of the overall status of a computing device 300, 400, along with specific details of the status may be displayed via one or more of the following mechanisms: Logs; Notification messages; Product or emailed reports; and a graphical user interface (GUI) of the system 100. In preferred embodiments, a communication engine 134 may be configured to present data on a display screen 404A which may include the combined status of each data health indicator that may be rolled up or combined into a simple message and shown to the user 101 via notifications, reports, logs and/or a user interface. In further embodiments, a communication engine 134 may be configured to enable the communication or access of data between one or more engines 131, 132, 133, and one or more servers 300 and client devices of the system 100. For example, a communication engine 134 may govern the electronic communication between components of the system 100 by initiating, maintaining, reestablishing, and terminating electronic communication between one or more user devices 400 and servers 300 and their respective data stores 308, 408, and one or more engines 131, 132, 133.

Figure 5:
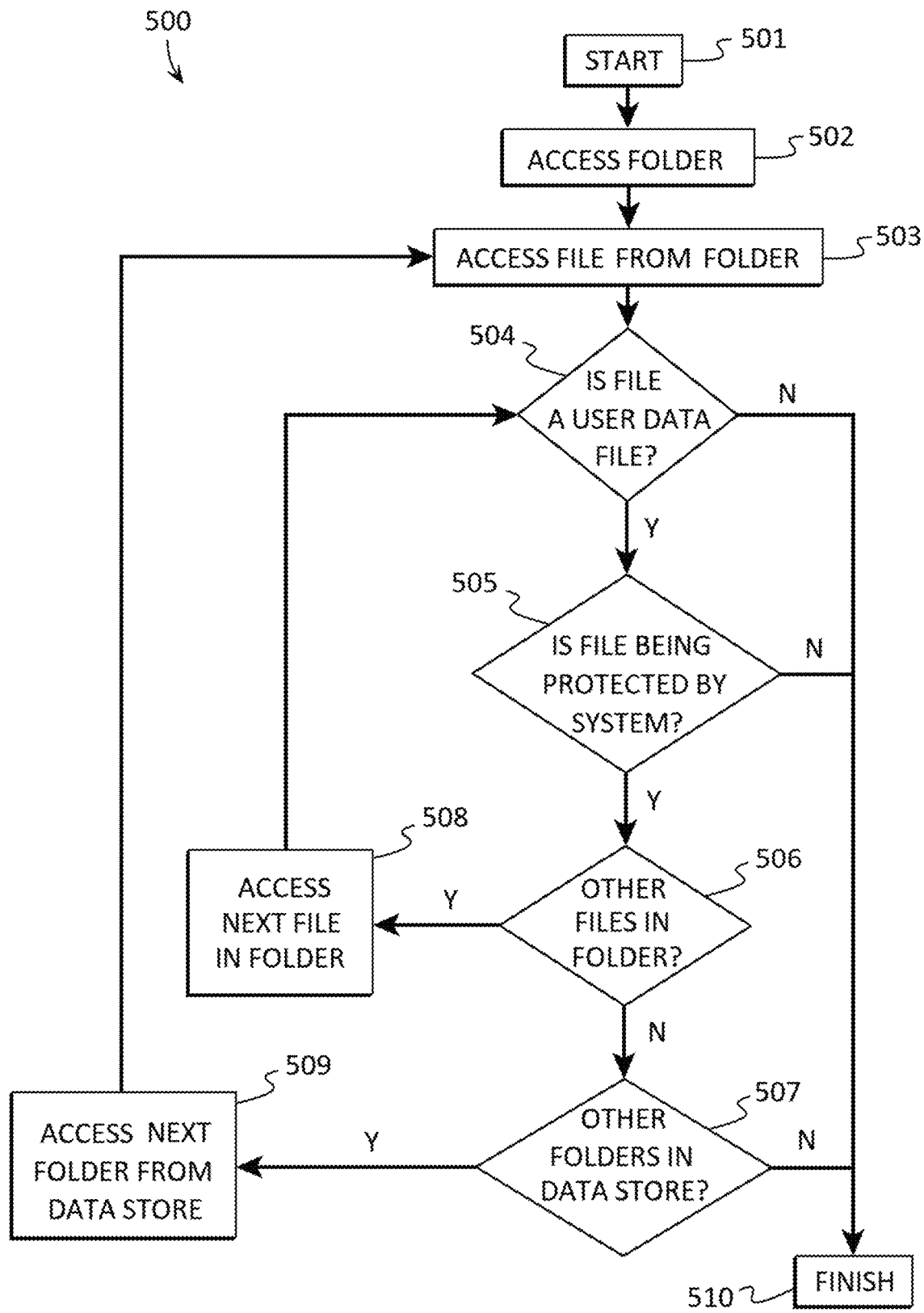
FIG. 5—FIG. 5 illustrates a block diagram illustrating an example of a computer-implemented method of collecting data protection information according to various embodiments described herein.

FIG. 5 shows a block diagram of an example of a computer-implemented method of collecting data protection information ("the method") 500 according to various embodiments described herein. In some embodiments, the method 500 may be used to enable the collecting of information about which data, such as which may be organized into one or more folders having one or more files, in a data store 308, 408, of a computing device 300, 400, is protected and which data is not protected. Preferably, protected data may comprise data that has been recently backed up and/or is secure against ransomware attacks. One or more steps of the method 500 may be performed by an indexing engine 131, a physical parameter engine 132, a data parameter engine 133, and/or a communication engine 134 which may be executed by a computing device processor, such as a processor 302 (FIG. 2) and/or a processor 402 (FIG. 3).

In some embodiments, the method 500 may start 501 and a folder may be accessed from a data store 308, 408, in step 502. In preferred embodiments, the data parameter engine 133 may access, such as by retrieving, a first folder from a data store 308, 408, of a computing device 300, 400. The folder may be remote or local to the computing device 300, 400, that is running the data parameter engine 133.

Nest, in step 503 a file of the folder may be accessed from the data store 308, 408. In preferred embodiments, the data parameter engine 133 may access, such as by retrieving, a first file from the folder of the data store 308, 408, in step 502.

In decision block 504, the system 100 may determine if the file is a user data file. In preferred embodiments, the data parameter engine 133 may determine if the file is a user data file by analyzing or reading its parameters, such as its location information, owner information, content information, date information, file name, file type, and/or any other data of and associated with the file. Optionally, the data parameter engine 133 may store information describing the finding or determination made in decision block 504. Preferably, decision block 504 may be performed for each file in the data store 308, 408. In some embodiments, if the file is not a user data file, the method 500 may proceed to step 510 and the method 500 may finish.

If the file is a user data file, the method 500 may proceed to decision block 505 and the system 100 may determine if the file is being protected by the system 100. In preferred embodiments, the data parameter engine 133 may determine if the file is being protected by reading data of the file, such as its location information, owner information, content, date, file attributes, system volume information, and/or any other data of and/or associated with the file and optionally its respective data store 308, 408, and then comparing this data to a system database or other parameter which may identify the file as being protected by the system 100. Preferably, the data parameter engine 133 may also read or determine the time of the last back up of the file and may store information describing the finding or determination in the system database. Preferably, decision block 505 may be performed for each file in the data store 308, 408. In some embodiments, if the file is not being protected by the system 100, the method 500 may finish 510.

If the file is being protected by the system 100, the method 500 may proceed to decision block 506 and the data parameter engine 133 may determine if there are other files in the folder. If there are other files in the folder, the method 500 may proceed to step 508 and the data parameter engine 133 may access the next file in the folder in step 508 and then continue to step 504.

If there are no other files in the folder, the method 500 may proceed to decision block 507 and the data parameter engine 133 may determine if there are other folders in the data store 308, 408, in step 507. If there are other folders in the data store 308, 408, the method 500 may proceed to step 509 and the data parameter engine 133 may access the next folder in the database 330, 430. If there are no other folders in the data store 308, 408, the method 500 may finish 510.

Figure 6:
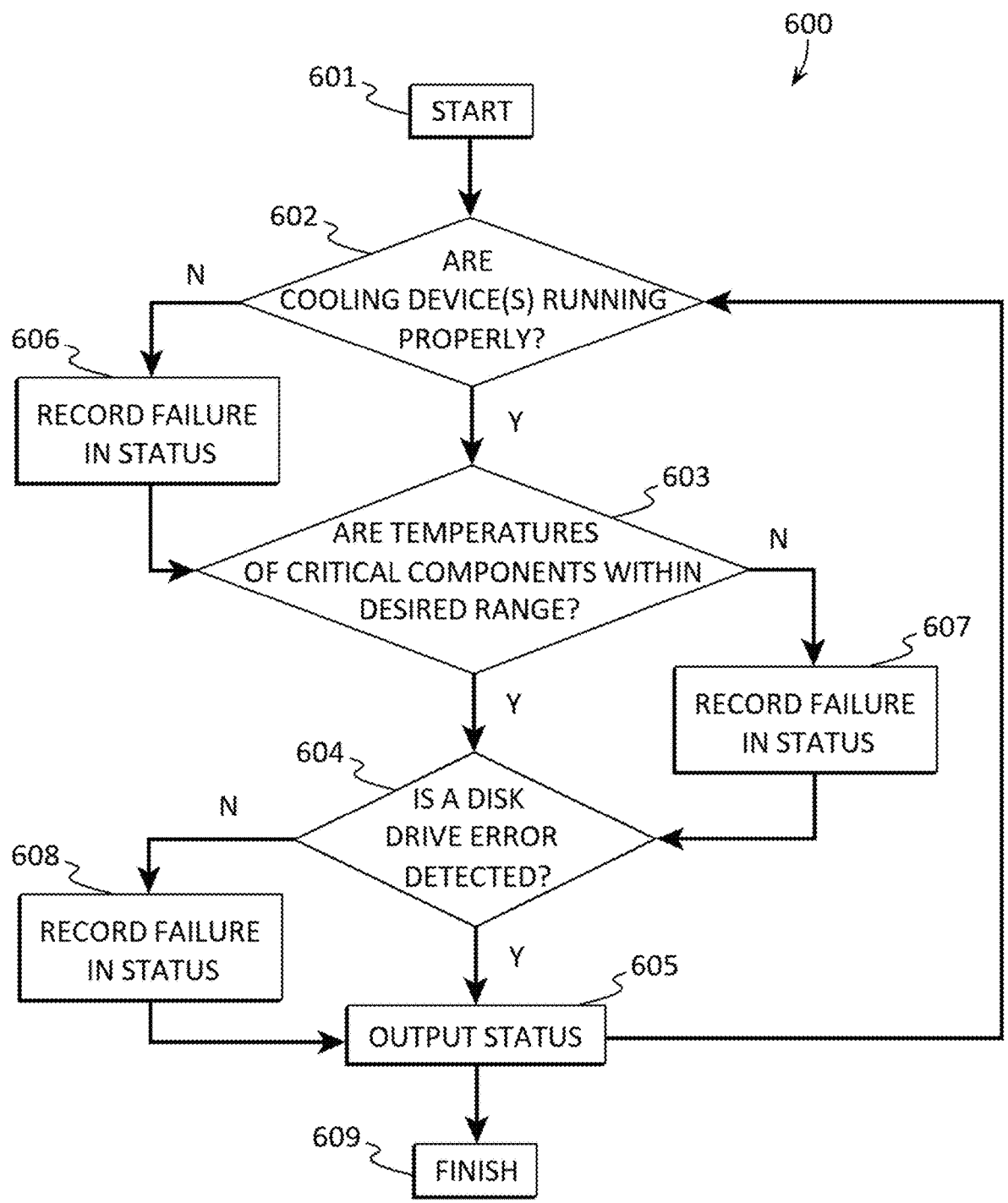
FIG. 6—FIG. 6 shows a block diagram illustrating an example of a computer-implemented method of collecting information about the potential of imminent hardware failure according to various embodiments described herein.

FIG. 6 illustrates a block diagram of an example of a computer-implemented method of collecting information about the potential of imminent hardware failure ("the method") 600 according to various embodiments described herein. In some embodiments, the method 600 may be used to enable the system 100 to determine if a computing device 300, 400, being monitored by the system 100 has the potential of imminent hardware failure and to output or display this potential to a user 101. One or more steps of the method 600 may be performed by an indexing engine 131, a physical parameter engine 132, a data parameter engine 133, and/or a communication engine 134 which may be executed by a computing device processor, such as a processor 302 (FIG. 2) and/or a processor 402 (FIG. 3).

In some embodiments, the method 600 may start 601 and in decision block the system 100 may determine if the one or more cooling devices, such as fans, of a computing device 300, 400, are running properly. In preferred embodiments, the physical parameter engine 132 may use information such as cooling device voltage, thermo-sensor data, and/or any other data which may be used to indicate that the cooling device(s) are running properly. If the cooling devices are not running properly, the method 600 may continue to step 606, the failure may be recorded in a status log or other database, and the method 600 may continue to decision block 603. If the cooling devices are running properly, the method 600 may continue directly to decision block 603.

In decision block 603 the system 100 may determine if the temperatures of critical components of the computing device 300, 400, are within a desired range that may be the correct operating range. In preferred embodiments, the physical parameter engine 132 may determine if the temperatures of critical components, such as hard disk data store 408, motherboard type local interface 412, central processing unit (CPU) or processor 402, graphics card 416, etc., are within correct operating range via one or more temperature sensors of the critical components. If the temperatures of critical components are not within correct operating range, the method 600 may continue to step 607, the failure may be recorded in a status log or other database, and the method 600 may continue to decision block 604. If the temperatures of critical components are within correct operating range, the method 600 may continue directly to decision block 604.

In decision block 604 the system 100 may determine if there is a disk drive error, such as a read/write error, detected in the data store 308, 408, of the computing device 300, 400. In preferred embodiments, the physical parameter engine 132 may determine if there is a disk read/write error by analyzing or reading S.M.A.R.T. (Self-Monitoring Analysis and Reporting Technology) of the data store 308, 408, which monitors the disk status by using various methods and devices (sensors). A single hard disk may have 30 or more such measured values, which are called attributes. Some of them directly or indirectly affect hard disk health status and others give statistical information. If a disk read/write error is detected, the method 600 may continue to step 608, the failure may be recorded in a status log or other database, and the method 600 may continue to step 605. If a disk read/write error is not detected, the method 600 may continue directly to step 605.

In step 605, the system 100 may output status to the user 101 preferably via a display screen 404A of a computing device 300, 400. In preferred embodiments the status may comprise any failure recorded in steps 606, 607, and 608. In further preferred embodiments, the status may be communicated to a user by a communication engine 134, and the communication engine 134 may output the status to a display screen 404A. Optionally, the physical parameter engine 132 may output the status to a log or other database. In some embodiments, the method 600 may proceed to step 602 so as to be continuous while a computing device 300, 400, is running. In other embodiments, after step 605, the method 600 may finish 609.

Figure 7:
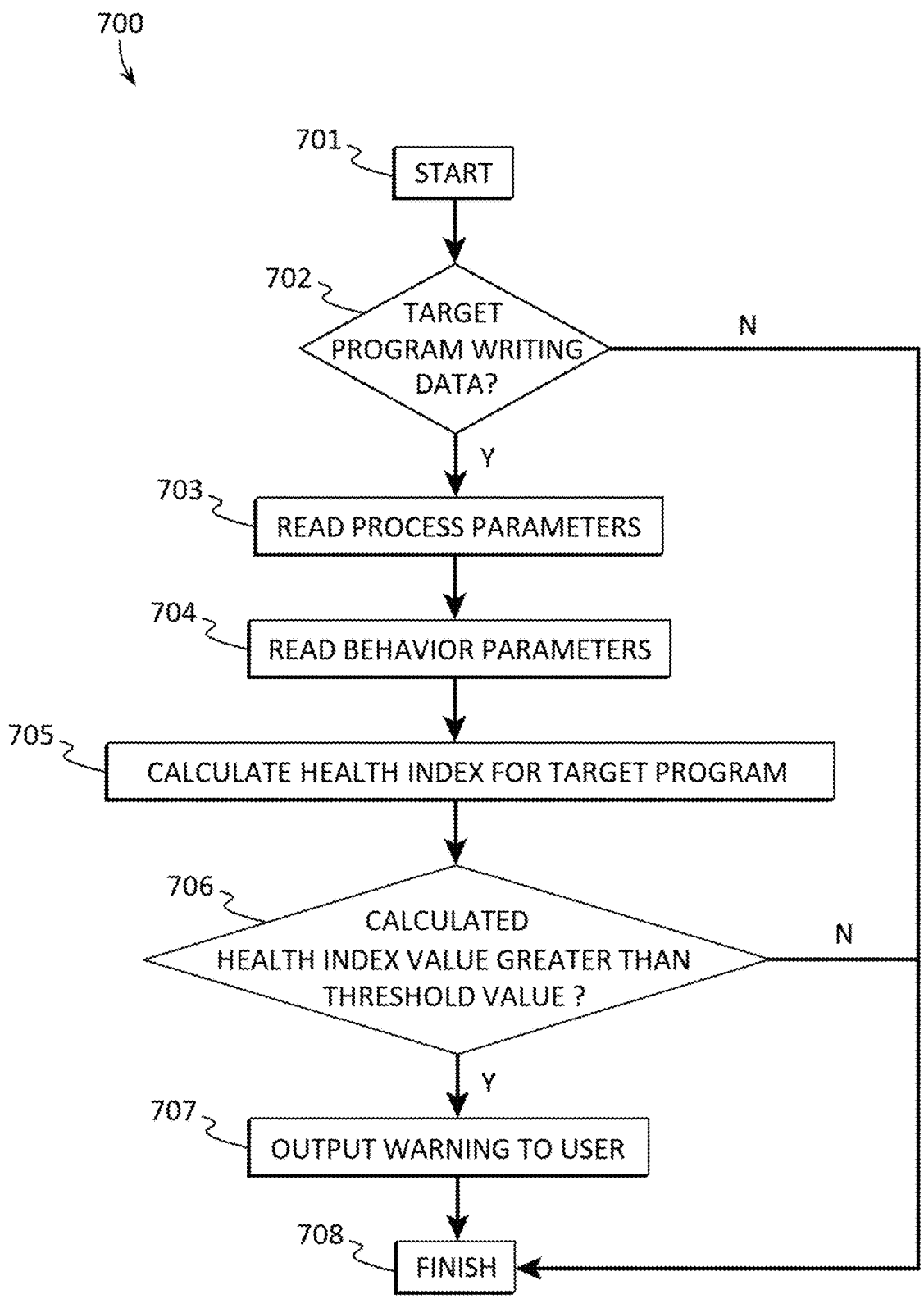
FIG. 7—FIG. 7 depicts a block diagram illustrating an example of a computer-implemented method of collecting information about health index data activity according to various embodiments described herein.

FIG. 7 illustrates a block diagram of an example of a computer-implemented method of collecting information about health index data activity ("the method") 700 according to various embodiments described herein. In some embodiments, the method 700 may be used to enable the system 100 to monitor different indicators which may affect the health of data for early warning signs that could indicate future data loss or corruption by collecting information about one or more parameters on data of a computing device 300, 400. Health index activity may include excess amount of activity, type of activity, level of trust in applications that modify data, low disk space, etc. One or more steps of the method 700 may be performed by an indexing engine 131, a physical parameter engine 132, a data parameter engine 133, and/or a communication engine 134 which may be executed by a computing device processor, such as a processor 302 (FIG. 2) and/or a processor 402 (FIG. 3).

In some embodiments, the method 700 may start 701 and the system 100 may determine if a program is writing or otherwise accessing data in decision block 702. A program that is writing or otherwise accessing data may be referred to as a target program 900. In preferred embodiments, an indexing engine 131 may determine if a target program 900 is writing or otherwise accessing data of a computing device 300, 400. If the target program 900 is not writing or otherwise accessing data, the method 700 may continue to step 708 and the method 700 may finish. If the target program 900 is writing or otherwise accessing data, the method 700 may continue to step 703.

In step 703, the system 100 may read or retrieve process parameters of the target program 900 running on the computing device 300, 400. In preferred embodiments, the indexing engine 131 may read or retrieve process parameters which may include: if the executable of the target program 900 is signed by a legitimate signature authority; if the target program 900 is located in the proper binaries location; if the target program 900 was installed by an unauthorized user; if the target program 900 was downloaded from the internet; if the target program 900 was obtained from an email; and any other process parameter of the target program 900.

In step 704, the system 100 may read or retrieve behavior parameters of the target program 900 running on the computing device 300, 400. In preferred embodiments, the indexing engine 131 may read or retrieve behavior parameters which may include: if the target program 900 is reading and/or writing to a large number of files, such as all or almost all files of a data store 308, 408, (greater than a threshold value) of the computing device 300, 400; if the target program 900 has written a file that increased the entropy or randomness of the file, such as by increasing the entropy value of the file beyond a threshold value, has a high entropy value (such as greater than 5); if the target program 900 has changed the magic number of a file; and any other behavior parameter of the target program 900.

As a non-limiting example, a reading and/or writing threshold value may be between approximately 20 percent to 100 percent, such as 35 percent, of the files or data in a data store 308, 408. If a target program 900 is reading and/or writing more than 35 percent of the file(s) or data in a data store 308, 408, the indexing engine 131 may read or retrieve that behavior parameter in step 704.

A file's entropy value refers to a value that is essentially a measure of the predictability of any specific character in the file, based on preceding characters. In other words, it's a measure of the "randomness" of the data in a file, where typical text files will have a low value, and encrypted or compressed files will have a high value. Any suitable method for determining a file's entropy or randomness may be used. For example, "Shannon Entropy", named for Claude Shannon may be used in which the randomness of a file is measured on a scale of 1 to 8. As another example, the file content of a file may be input to the Monte Carlo Pi Estimation in which the closer the calculated Pi value of the file is to the actual value of 7 means the more random the file and the greater the likeliness of the file being encrypted. This can be used to estimate the "randomness" of the data.

As a non-limiting example, an entropy threshold value may be between approximately 20 percent to 100 percent, such as 55 percent, of a maximum entropy value of a desired method of determining a file's entropy or randomness. If the desired method of determining a file's entropy or randomness is via a Shannon Entropy and if the indexing engine 131 determines that the target program 900 has written a file that increased the entropy or randomness of a file(s) or data in a data store 308, 408, from 3 to 6 (on a scale of 1 to 8 with the value of 6 being above the exemplary entropy threshold value of 55 percent) the indexing engine 131 may read or retrieve that behavior parameter in step 704.

In step 705, the system 100 may calculate a health index value for the target program 900. In preferred embodiments, the indexing engine 131 may calculate a health index value for the target program 900. The formula of calculating the Health Index (HI) value may be collected via many samples of actual usage patterns of users 101 and target programs 900. In preferred embodiments, calculation of the health index value comprises combining, such as via addition and multiplication, the process parameter constant with the behavior parameter constant. For example, a naïve pseudo code may be as follows:

HI=0;
If (executable is not signed) HI=HI+c1
If (executable is downloaded from Internet) HI=HI+c2
If (executable is downloaded from email) HI=HI+c3
If (executable is not in legitimate guard system space (such as being located in c:\Program Files)) HI=HI+c4

The values c1, c2, c3, c4, . . . , cn, may be constant values which may be added or otherwise combined together to generate a Health Index (HI) value.

In further embodiments, the system 100 may comprise a process parameter and a behavior parameter, in which the process parameter comprises a process parameter constant value and the behavior parameter comprises a behavior parameter constant value, and the health index calculation may comprise both the process parameter constant value and the behavior parameter constant value.

In decision block 706, the system 100 may determine if the calculated health index value is greater than an index threshold value. An index threshold value may comprise any value above which may indicate that the target program 900 is suspicious and may be causing the health of the computing device 300, 400, to decrease or deteriorate. In preferred embodiments, the indexing engine 131 may compare the calculated health index value for the target program 900 to the threshold value to determine which value is larger. If the threshold value is larger, in some embodiments, the method 700 may proceed to step 703 so as to be continuous while a computing device 300, 400, is running. In other embodiments, if the threshold value is larger, the method 700 may finish 708. If the health index value is larger, the method 700 may proceed to step 706.

In step 707, the system 100 may output a warning. In some embodiments, the system 100 may output a warning to a user 101 preferably via a display screen 404A of a computing device 300, 400. In other embodiments, the system 100 may output a warning to a log file, report, or by any other system or method. In preferred embodiments, the warning may be communicated to a user by a communication engine 134, and the communication engine 134 may output the status to a display screen 404A. In further preferred embodiments the warning may comprise information which may alert the user 101 that the program may be malicious or suspicious or otherwise decreasing the health of the computing device 300, 400, that is running it. For example, the communication engine 134 may cause "executable is exhibit ransomware behavior and your data is at risk" to be displayed on a display screen 404A of the computing device 300, 400. After step 706, the method 700 may finish 708.

Figure 8:
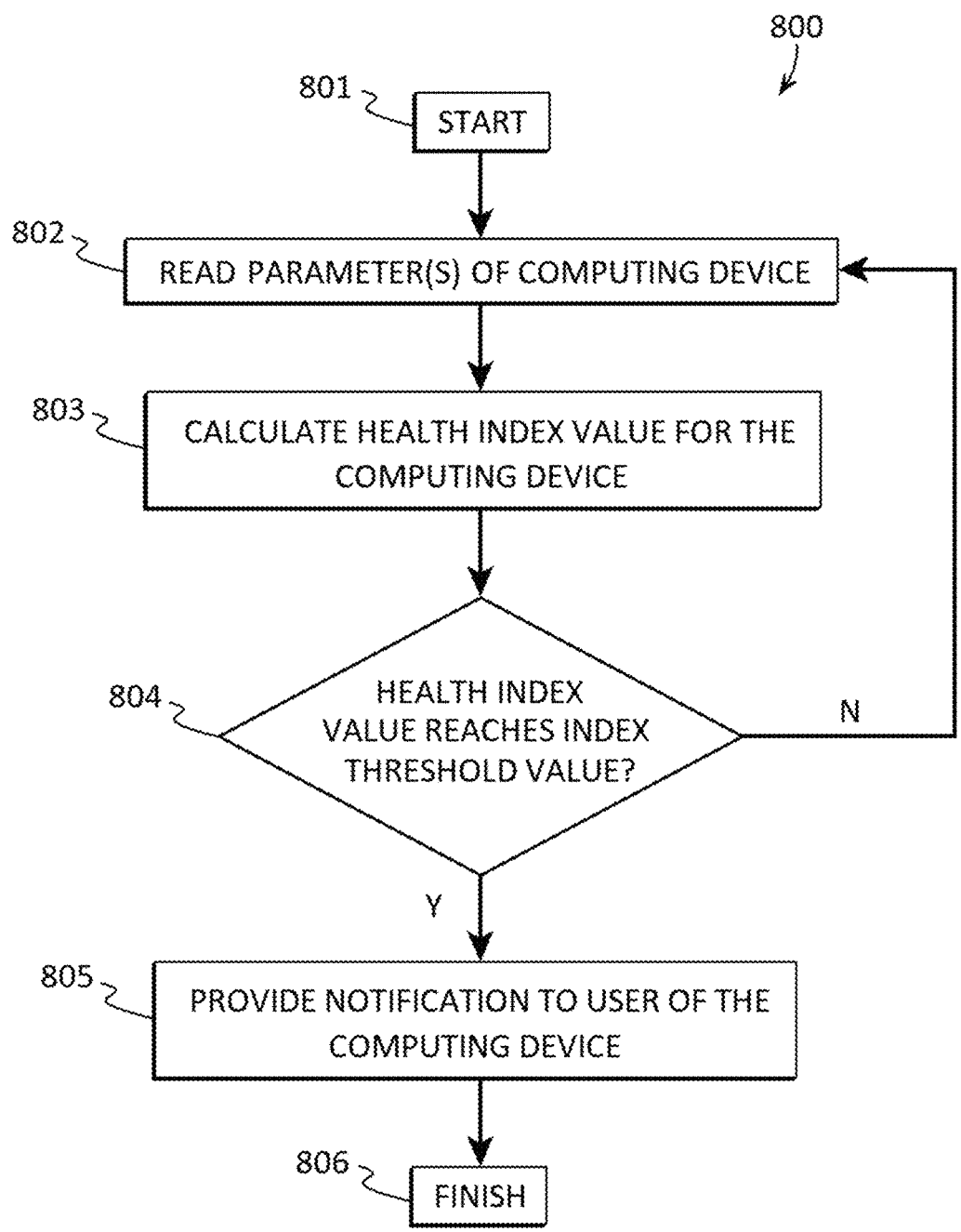
FIG. 8—FIG. 8 illustrates a block diagram illustrating an example of a computer-implemented computing device health monitoring method according to various embodiments described herein.

FIG. 8 depicts a block diagram of an example of a computer implemented computing device health monitoring method ("the method") 800 according to various embodiments described herein. In some embodiments, the method 800 may be used to enable the system 100 to monitor different indicators or parameters which may affect the health of a computing device 300, 400, and to provide information, which may be contained in notifications, to a user 101 of the computing device 300, 400, which may inform the user 101 of the health of the computing device 300, 400. One or more steps of the method 800 may be performed by an indexing engine 131, a physical parameter engine 132, a data parameter engine 133, and/or a communication engine 134 which may be executed by a computing device processor, such as a processor 302 (FIG. 2) and/or a processor 402 (FIG. 3).

The method 800 may start and one or more parameters of a computing device may be read by an indexing engine 131 in step 802.

In some embodiments, parameters or indicators of a computing device 300, 400, which may be read or otherwise determined by an indexing engine 131 may include: a number of read and write errors of a data store 308, 408, memory 310, 410, etc., of the computing device 300, 400; a disk temperature of a data store 308, 408, memory 310, 410, etc., of the computing device 300, 400; a time of a last back up of a plurality of files of a data store 308, 408, memory 310, 410, etc., of the computing device 300, 400; a number of blue screen of deaths (BSODs) or system crashes of the computing device 300, 400; S.M.A.R.T. status; and an amount and/or percentage of free disk space of a data store 308, 408, memory 310, 410, etc., of the computing device 300, 400.

In further embodiments, an indexing engine 131 may be configured to read or monitor process parameters of the computing device 300, 400, that is running the target program 900. Process parameters may include: if the target program 900 is signed by a legitimate signature authority; if the target program 900 is located in the proper binaries location; if the target program 900 was installed by an unauthorized user (an unauthorized user being someone or an entity, such as a malicious program, that gains access a computing device 300, 400, of the system 100 using someone else's account/login information or other methods); if the target program 900 was downloaded from the internet; if the target program 900 was obtained from an email; if the target program 900 is unknown; and any other process parameter of the target program 900. In preferred embodiments, the indexing engine 131 may detect if the target program 900 is unknown using screening software, such as by leveraging Microsoft's SmartScreen or Symantec Insight, etc. For example, the indexing engine 131 may query an antivirus program running of the computing device 300, 400, for some index value indicating how common or known the target program 900 or process is.

In further embodiments, an indexing engine 131 may be configured to read or monitor behavior parameters of the computing device 300, 400, that is running the target program 900. Behavior parameters may include: if the target program 900 is reading and/or writing to all or almost all files on the computing device 300, 400; if the target program 900 has written a file that has a high entropy value; if the target program 900 changes the magic number of a file; the percentage of files manipulated, such as by being created, modified, renamed or deleted, by the target program 900; and any other behavior parameter of the target program 900.

In step 803, a health index value may be calculated for the computing device 300, 400, by the indexing engine 131.

In some embodiments, a health index value may be calculated for the computing device 300, 400, by the indexing engine 131 using a parameter or indicator that may include a number of read and write errors of a data store 308, 408, memory 310, 410, etc., of the computing device 300, 400. In preferred embodiments, if an indexing engine 131 reads a parameter or otherwise detects an increase in the read and write errors on a data store 308, 408, memory 310, 410, etc., of the computing device 300, 400, the indexing engine 131 may calculate or change the health index value, such as by decreasing the health index value.

In further embodiments, a health index value may be calculated for the computing device 300, 400, by the indexing engine 131 using a parameter or indicator that may include a time of a last back up of a plurality of files of a data store 308, 408, memory 310, 410, etc., of the computing device 300, 400. In this manner, an indexing engine 131 may determine a time of a last backup of the plurality of files, and the time determined by the indexing engine 131 may change the health index value. For example, if the time of a last back up was a relatively long time ago (e.g., last year), the indexing engine 131 may calculate or change the health index value, such as by decreasing the health index value. As another example, if the time of a last back up was a relatively short time ago (e.g. two days ago), the indexing engine 131 may calculate or change the health index value, such as by increasing the health index value.

In further embodiments, parameters or indicators of a computing device 300, 400, which may be used to calculate a health index value may include a disk temperature of a data store 308, 408, memory 310, 410, etc., of the computing device 300, 400. In preferred embodiments, if an indexing engine 131 reads a parameter or otherwise detects a change in the disk temperature of a data store 308, 408, memory 310, 410, etc., of the computing device 300, 400, the indexing engine 131 may change the health index value. For example, if an indexing engine 131 reads a parameter or otherwise detects an increase in the disk temperature of a data store 308, 408, memory 310, 410, etc., the indexing engine 131 may decrease the health index value.

In further embodiments, parameters or indicators of a computing device 300, 400, which may be used to calculate a health index value may include a number of blue screen of deaths (BSODs) or system crashes of the computing device 300, 400. Preferably, the indexing engine 131 may be configured to read a parameter that comprises determining if a number of blue screen of deaths (BSODs) or system crashes of a computing device 300, 400, in a time period reaches a crash threshold, and the indexing engine 131 may change the health index value if the crash threshold is reached. For example, if the crash threshold is two blue screen of deaths (BSODs) or system crashes of the computing device 300, 400, in a time period of one week, and the indexing engine 131 reads a parameter or otherwise determines that the computing device 300, 400 has suffered from two or more system crashes in the last week, the indexing engine 131 may change the health index value by decreasing the value to indicate that the health of the computing device 300, 400, is deteriorating.

In further embodiments, parameters or indicators of a computing device 300, 400, which may be used to calculate a health index value may include an amount and/or percentage of free disk space of a data store 308, 408, memory 310, 410, etc., of the computing device 300, 400. Preferably, the indexing engine 131 may be configured to read a parameter that comprises determining if an amount of free space of the data store 308, 408, memory 310, 410, etc., of the computing device 300, 400, reaches a storage threshold, and the indexing engine 131 may calculate or change the health index value if the storage threshold is reached. For example, if the storage threshold is 10 GBs and/or less than 5% of the total disk space is free, and the indexing engine 131 reads a parameter or otherwise determines that a data store 308, 408, of computing device 300, 400 has reached a total free disk space of 10 GBs and/or less than 5%, the indexing engine 131 may calculate or change the health index value by decreasing the value to indicate that the health of the computing device 300, 400, is deteriorating.

In some embodiments, a health index value may be calculated for the computing device 300, 400, by the indexing engine 131 using a process parameter or indicator that may include if the target program 900 is signed by a legitimate signature authority. In preferred embodiments, the indexing engine 131 may be configured to read a process parameter that comprises reading if an executable of a target program 900 is signed by a legitimate authority, and the indexing engine 131 may calculate the health index value using the process parameter that comprises reading if an executable of a target program is signed by a legitimate authority. For example, if a target program 900 is signed by a legitimate authority, the indexing engine 131 may calculate a relatively higher or better health index value. As another example, if a target program 900 is not signed by a legitimate authority, the indexing engine 131 may calculate a relatively lower or worse health index value.

In further embodiments, a health index value may be calculated for the computing device 300, 400, by the indexing engine 131 using a process parameter or indicator that may include if the target program 900 is located in the proper binaries location. In this manner, a location of a target program on the computing device 300, 400, may impact the health index value. For example, if the location of target program 900 is in the proper binaries location, the indexing engine 131 may calculate a relatively higher or better health index value. As another example, if the location of target program 900 is not in the proper binaries location, the indexing engine 131 may calculate a relatively lower or worse health index value.

In further embodiments, a health index value may be calculated for the computing device 300, 400, by the indexing engine 131 using a process parameter or indicator that may include if the target program 900 was installed by an unauthorized user or an authorized user. Generally, an unauthorized user may be someone or an entity, such as a malicious program, that gains access a computing device 300, 400, of the system 100 using someone else's account/login information or other methods, and an authorized user may be someone or an entity that is the owner of the computing device 300, 400, or who has the permission of the owner to use the computing device 300, 400. For example, if the target program 900 was installed by an authorized user, the indexing engine 131 may calculate a relatively higher or better health index value. As another example, if the target program 900 was installed by an unauthorized user, the indexing engine 131 may calculate a relatively lower or worse health index value.

In further embodiments, a health index value may be calculated for the computing device 300, 400, by the indexing engine 131 using a process parameter or indicator that may include if the target program 900 was downloaded from the internet. For example, if the target program 900 was not downloaded from the internet (e.g. installed via physical installation media), the indexing engine 131 may calculate a relatively higher or better health index value. As another example, if the target program 900 was downloaded from the internet, the indexing engine 131 may calculate a relatively lower or worse health index value.

In further embodiments, a health index value may be calculated for the computing device 300, 400, by the indexing engine 131 using a process parameter or indicator that may include if the target program 900 was obtained from an email. For example, if the target program 900 was not obtained from an email (e.g., installed via physical installation media), the indexing engine 131 may calculate a relatively higher or better health index value. As another example, if the target program 900 was obtained from an email, the indexing engine 131 may calculate a relatively lower or worse health index value.

In further embodiments, a health index value may be calculated for the computing device 300, 400, by the indexing engine 131 using a process parameter or indicator that may include if the target program 900 is unknown. For example, if the target program 900 is not unknown, the indexing engine 131 may calculate a relatively higher or better health index value. As another example, if the target program 900 is unknown, the indexing engine 131 may calculate a relatively lower or worse health index value which may result in the system 100 being more critical about the target program 900, and as a further example, an unknown target program 900 may be limited by the system 100 to only take action on 100 files rather than 200.

In some embodiments, the indexing engine 131 may calculate the health index value using the behavior parameter that comprises determining if a threshold percentage of the plurality of files on the data store 308, 408, memory 310, 410, etc., of the computing device 300, 400, are being read, optionally by a target program 900. In some embodiment, the indexing engine 131 may be configured to read a behavior parameter that comprises determining if a threshold percentage of the plurality of files on the data store 308, 408, memory 310, 410, etc., of the computing device 300, 400, are being read, and the indexing engine 131 may calculate or change the health index value if the threshold percentage is reached. For example, if the threshold percentage is 51 percent of the files being read, and the indexing engine 131 reads a parameter or otherwise determines that at least 51 percent of the files of the data store 308, 408, of computing device 300, 400, are being read, the indexing engine 131 may change the health index value by decreasing the value to indicate that the health of the computing device 300, 400, is deteriorating. In further embodiments, the indexing engine 131 may be configured to read a behavior parameter that comprises determining if a number of files on the data store 308, 408, memory 310, 410, etc., of the computing device 300, 400, read by a target program 900 reaches a reading threshold, and the indexing engine 131 may calculate or change the health index value if the reading threshold is reached. For example, if the reading threshold is 25 percent of the files being read, and the indexing engine 131 reads a parameter or otherwise determines that at least 25 percent of the files of the data store 308, 408, of computing device 300, 400, are being read by a target program 900, the indexing engine 131 may calculate or change the health index value by decreasing the value to indicate that the health of the computing device 300, 400, is deteriorating.

In some embodiments, the indexing engine 131 may calculate the health index value using the behavior parameter that comprises determining if there was an increase in entropy of a file of the plurality of files, such as by determining if the target program 900 has written a file that has a high entropy value. For example, if the indexing engine 131 reads a parameter or otherwise determines that a file having a high entropy value is written to the data store 308, 408, of computing device 300, 400, by a target program 900, the indexing engine 131 may calculate or change the health index value by decreasing the value.

In some embodiments, the indexing engine 131 may calculate the health index value using the behavior parameter that comprises determining if the target program 900 changes the magic number of one or more files on the data store 308, 408, of computing device 300, 400 where the magic number can be alphanumeric text, character, or bytes that are used to identify a particular file type. For example, if the indexing engine 131 reads a parameter or otherwise determines that the magic number of one or more files on the data store 308, 408, of computing device 300, 400, was changed by a target program 900, the indexing engine 131 may calculate or change the health index value by decreasing the value.

In some embodiments, the indexing engine 131 may calculate the health index value using the behavior parameter that comprises determining if the percentage of files created, modified, renamed, deleted, or otherwise manipulated by the target program 900. For example, if the indexing engine 131 reads a parameter or otherwise determines that the magic number of one or more files on the data store 308, 408, of computing device 300, 400, was changed by a target program 900, the indexing engine 131 may calculate or change the health index value by decreasing the value.

In further embodiments, the indexing engine 131 may be configured to read a behavior parameter that comprises determining if a percentage of files created, modified, renamed, deleted, or otherwise manipulated by the target program 900 on the data store 308, 408, memory 310, 410, etc., of the computing device 300, 400, reaches a manipulation threshold, and the indexing engine 131 may calculate or change the health index value if the manipulation threshold is reached. For example, if the manipulation threshold is 35 percent of the files being manipulated, and the indexing engine 131 reads a parameter or otherwise determines that at least 35 percent of the files of the data store 308, 408, of computing device 300, 400, are being or were manipulated by a target program 900, the indexing engine 131 may calculate or change the health index value by decreasing the value to indicate that the health of the computing device 300, 400, is deteriorating.

In step 804, the indexing engine 131 may determine if the calculated health index value reaches an index threshold value. Generally, an index threshold value may comprise a threshold value which may be used to trigger the performance of one or more actions by the system 100. In some embodiments, a calculated health index value may reach an index threshold value by the calculated health index value meeting or exceeding an index threshold value. In further embodiments, a calculated health index value may reach an index threshold value by the calculated health index value meeting or being below an index threshold value. If the calculated health index value reaches an index threshold value, the method 800 may proceed to step 805. If the calculated health index value does not reach an index threshold value, the method 800 may proceed to step 802, and the indexing engine 131 may continue to read parameters of computing device 300, 400.

In step 805, a notification may be provided to the user 101 of the computing device 300, 400, by the indexing engine 131. Generally, a notification may comprise a sound, pop-up message or text box, video, animation, which may be output via a computing device 300, 400, such as via a display screen 404A or other I/O interface 304, 404, and which may indicate to the user 101 that the health of their computing device 300, 400, is increasing, deteriorating, or otherwise needs attention. In preferred embodiments, a notification may be provided to the user 101 of the computing device 300, 400, by the indexing engine 131 when the calculated health index value reaches, such as by meeting or falling below, an index threshold value. In further preferred embodiments, a notification may be provided to the user 101 of the computing device 300, 400, by the indexing engine 131 when the calculated health index value reaches, such as by meeting or exceeding, an index threshold value. After step 805, the method 800 may finish 806.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), light emitting diode (LED) display, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random-access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD), light emitting diode (LED) display, or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented data health monitoring system, the system comprising:
   a computing device having a processor, a memory in communication with the processor, and a data store having a plurality of files;
   an indexing logic executed by the processor and configured to read and measure both a behavior parameter and a physical parameter of the computing device, where both the behavior parameter and the physical parameter are used as inputs by the indexing logic to calculate a health index value; and
   wherein the indexing logic calculates the health index value using both:
   i) the behavior parameter selected from at least one of; a percentage of the plurality of files that have been manipulated by a target program, and determining if there was a change of magic number of a file in the data store; and
   ii) the physical parameter selected from at least one of, a number of read and write errors on the data store, and a disk temperature of the data store.

2. The system of claim 1, wherein an increase in the read and write errors on the data store changes the health index value.

3. The system of claim 1, wherein a change in the disk temperature of the data store changes the health index value.

4. The system of claim 1, wherein the indexing logic changes the health index value using the behavior parameter that comprises determining if there was a change of a magic number of a file in the data store.

5. The system of claim 1, wherein the indexing logic is configured to read a process parameter that comprises reading if a target program was obtained from an email, and wherein the indexing logic calculates the health index value using the process parameter that comprises reading if a target program was obtained from an email.

6. The system of claim 1, wherein the indexing logic is configured to read a parameter that comprises determining a time of a last backup of the plurality of files, and wherein the determined time changes the health index value.

7. The system of claim 1, wherein the indexing logic is configured to read a process parameter that comprises determining if a target process is unknown, and wherein the indexing logic calculates the health index value using the process parameter that comprises determining if the target process is unknown.

8. The system of claim 1, wherein the indexing logic is configured to read a process parameter that comprises reading if an executable of a target program is signed by a legitimate authority, and wherein the indexing logic calculates the health index value using the process parameter that comprises reading if an executable of a target program is signed by a legitimate authority.

9. The system of claim 1, wherein a location of a target program on the computing device impacts the health index value.

10. The system of claim 1, wherein the indexing logic is configured to read a process parameter that comprises reading if a target program was installed by an authorized user, and wherein the indexing logic calculates the health index value using the process parameter that comprises reading if a target program was installed by an authorized user.

11. The system of claim 1 wherein the indexing logic is configured to read the behavior parameter that comprises determining if a threshold percentage of the plurality of files on the data store are read, and wherein the indexing logic calculates the health index value using the behavior parameter that comprises determining if the threshold percentage is reached.

12. The system of claim 1, wherein the indexing logic is configured to read the behavior parameter that comprises determining if a number of files on the data store read by a target program reaches a reading threshold, and wherein the indexing logic calculates the health index value using the behavior parameter that comprises determining if the reading threshold is reached.

13. The system of claim 1, wherein the indexing logic is configured to read a parameter that comprises determining if a number of system crashes of the computing device in a time period reaches a crash threshold, and wherein the health index value is changed if the crash threshold is reached.

14. The system of claim 1, wherein the indexing logic is configured to read a parameter that comprises determining if an amount of free space of the data store reaches a storage threshold, and wherein the health index value is changed if the storage threshold is reached.

15. The system of claim 1, wherein the indexing logic is configured to read a behavior parameter that comprises determining if there was an increase in entropy of a file of the plurality of files, and wherein the indexing logic calculates the health index value using the behavior parameter that comprises determining if there was an increase in entropy of the plurality of files.

16. The system of claim 1, further comprising a process parameter and a behavior parameter, wherein the process parameter comprises a process parameter constant value, wherein the behavior parameter comprises a behavior parameter constant value, and wherein the health index value comprises both the process parameter constant value and the behavior parameter constant value.

17. The system of claim 1, wherein the indexing logic provides a notification to a user of the computing device if the health index value reaches an index threshold value.

* * * * *